United States Patent [19]

Orr et al.

[11] Patent Number: 4,753,808
[45] Date of Patent: Jun. 28, 1988

[54] PACKAGED PRE-CUT VEGETABLES

[75] Inventors: Avigdor Orr, Highland Park; John O. Spingler, Plainsboro, both of N.J.

[73] Assignee: DNA Plant Technology Corporation, Cinnaminson, N.J.

[21] Appl. No.: 114,819

[22] Filed: Oct. 29, 1987

Related U.S. Application Data

[63] Continuation of Ser. No. 792,338, Oct. 29, 1985, Pat. No. 4,711,789.

[51] Int. Cl.$^4$ .................. A23B 7/14; A23B 7/148; B65B 31/00
[52] U.S. Cl. .................. 426/106; 426/615
[58] Field of Search .............. 426/106, 324, 415, 419, 426/326, 481, 518, 232, 615; 83/177, 53; 99/567, 635, 636, 637, 638, 43

[56] References Cited

U.S. PATENT DOCUMENTS

| | | | |
|---|---|---|---|
| 2,611,709 | 9/1952 | Plagge | 426/124 |
| 3,351,113 | 11/1967 | Suzuki et al. | 83/177 |
| 3,394,746 | 7/1968 | Teigen | 426/481 |
| 3,450,543 | 6/1969 | Badran et al. | 426/415 |
| 3,450,544 | 6/1969 | Badran et al. | 426/415 |
| 3,526,162 | 9/1970 | Wilcox | 83/177 |
| 3,532,014 | 10/1970 | Franz | 83/177 |
| 3,558,329 | 1/1971 | Hess | 426/324 |
| 3,795,749 | 3/1974 | Cummin et al. | 426/326 |
| 3,814,820 | 6/1974 | Busta et al. | 426/262 |
| 3,849,581 | 11/1974 | Kubu | 426/324 |
| 3,922,362 | 11/1975 | Pierce | 426/415 |
| 3,976,795 | 8/1976 | Ando | 426/124 |
| 3,987,208 | 10/1976 | Rahman et al. | 426/326 |
| 4,001,443 | 1/1977 | Dave | 426/326 |
| 4,152,958 | 5/1979 | Bogert | 83/177 |
| 4,168,597 | 9/1979 | Cayton | 426/324 |
| 4,216,906 | 8/1980 | Olsen et al. | 83/177 |
| 4,224,347 | 9/1980 | Woodruff | 426/316 |
| 4,246,838 | 1/1981 | Pulver et al. | 83/53 |
| 4,411,921 | 10/1983 | Woodruff | 426/316 |
| 4,435,902 | 3/1984 | Mercer et al. | 83/177 |
| 4,547,381 | 10/1985 | Mason et al. | 426/316 |

FOREIGN PATENT DOCUMENTS

| | | | |
|---|---|---|---|
| 2628982 | 1/1978 | Fed. Rep. of Germany | 426/518 |
| 1287585 | 8/1972 | United Kingdom | 83/177 |
| 1460711 | 1/1977 | United Kingdom | 83/177 |
| 204298 | 9/1980 | United Kingdom | 83/177 |

OTHER PUBLICATIONS

Pliofilm In Preserv. of Fla. Fruits & Veg. 2/42 U. of Fla., Pill Plus Spe. J. 7/72 vol. 28 #7.

*Primary Examiner*—Steven Weinstein
*Attorney, Agent, or Firm*—Pennie & Edmonds

[57] ABSTRACT

The shelf life of vegetables such as raw celery can be substantially increased by subjecting the raw celery to a process including selecting a portion of the celery that has characteristic chemical and physiological properties found in petioles of market mature celery, (b) slicing the celery to minimize bruising and tissue damage caused by tearing and compression, (c) treating the cut celery with water, (d) drying the surface of the cut celery, and (e) placing the pieces of celery in a sealed container to prevent microbial recontamination and maintain the celery in a viable condition.

6 Claims, 2 Drawing Sheets

PACKAGED PRE-CUT VEGETABLES

This is a continuation, of application Ser. No. 792,338, filed Oct. 29, 1985 now U.S. Pat. No. 4,711,789.

BACKGROUND OF THE INVENTION

1. Field of the Invention

This invention relates to a process for prolonging the shelf life of fresh vegetables. More particularly, it relates to prolonging the shelf life of vegetables having enlarged petioles. This invention especially relates to prolonging the shelf life of celery.

2. Description of the Prior Art

Fresh fruits and vegetables are extremely perishable commodities. Heretofore, many techniques have been employed to protect such food products from oxidative degradation, mold attack and moisture penetration and to preserve the freshness, texture and color of the fresh produce. One of the earliest means of lengthening the shelf life of fruits and vegetables was refrigeration. However, most fresh produce, when stored under reduced temperatures for prolonged periods, shows adverse effects on the taste, odor or quality of the product which is caused by biochemical changes and microbial growth. In addition, storage temperatures below 35° F. often cause chill injury to the tissue of the produce. Hence, in many instances, refrigeration alone is not effective in achieving the desired shelf life for a particular fruit or vegetable.

Coating fresh fruits and/or vegetables is another of these techniques which has been employed with varying degrees of success. Not only must the coating be effective in prolonging the useful shelf life of fresh produce, but the appearance of the commodity must not be altered from that of its natural state. At a minimum, this natural appearance must not only remain unchanged but should ideally be enhanced especially when the fruit or vegetable will be displayed for sale. The selection of a coating material is further indicated where the fruit or vegetable is to be consumed in its natural state, and it is considered essential that there be no need to remove the coating. In that event, the coating material must not only be edible, it should not affect or alter the natural organoleptic characteristics of the fresh fruit or vegetable.

Typical of these prior art coatings are the wax emulsions of U.S. Pat. Nos. 2,560,820 to Recker and 2,703,760 to Cunning. Coatings of natural materials have been employed including milk whey (U.S. Pat. No. 2,282,801 to Musher), lecithin (U.S. Pat. Nos. 2,470,281 to Allingham and 3,451,826 to Mulder), gelatin together with polyhydric alcohol (U.S. Patent to Whitman, et al.) and protein (U.S. Pat. No. 4,344,971 to Garbutt). Polymers have also been used extensively, viz., a thermoplastic polymer (U.S. Pat. No. 2,213,577 to Tisdale, et al.), vinyl acetate polymer (U.S. Pat. No. 3,410,696 to Rosenfield), a hydrophilic polymer (U.S. Pat. No. 3,669,691 to De Long, et al.) and the combination of a water soluble polymer and hydrophobic material (U.S. Pat. No. 3,997,674 to Ukai, et al.). Cellulosic materials have found utility in coating fruits and vegetables including hydrated cellulose (U.S. Pat. No. 1,774,866 to Beadle), a combination of cellulose and wax (U.S. Pat. No. 2,364,614 to Beatty), cellulose ether in combination with a fatty acid ester (U.S. Pat. No. 3,471,303 to Hamdy, et al.) or monoglyceride and a fatty acid metal salt (U.S. Pat. No. 3,461,304 to Hamdy, et al.), or a sucrose ester of a fatty acid (U.S. Pat. No. 4,338,342 to Tan, et al.).

Food preservation has for many years employed such mutually exclusive processes as dehydration and freezing. Both of these operations often include a heat treatment, known as blanching, which is conducted prior to the dehydration or freezing step. Blanching is said to reduce enzyme or bacteria level and to prevent or minimize undesirable changes during storage in the dry or frozen state, such as changes in color, odor, texture or loss of vitamins.

The cutting of fresh fruits and vegetables is generally disclosed in the prior art by several references. For instance, U.S. Pat. No. 4,157,681 to Ahesson, et al. describe the use of a machine for paring fruits and vegetables. Further, U.S. Pat. Nos. 2,475,142 to Kane and 2,437,637 to Bridge describe similar type machines for paring and slicing different fruits and vegetables.

While the art has provided several methods to extend the shelf life of vegetables or fruits, the need still exists for methods of extending the shelf life of fruits or vegetables that are more effective than previous methods have been able to accomplish.

Accordingly, it is one object of the present invention to prolong the post harvest life of fresh vegetables having enlarged petioles as a predominant feature.

Another object of the present invention is to prolong the shelf life of fresh celery.

A further object of this invention is to provide raw celery in a ready-to-eat form and to improve the shelf life of this fresh celery.

The achievement of these and other objects will be apparent from the following description of the subject invention.

SUMMARY OF THE INVENTION

These and other objects are achieved by selecting petioles of celery having particular enzymatic, chemical and physiological properties, slicing the petioles and packaging them in a sealed container.

In one embodiment, this invention concerns a process of maintaining in a viable form a fresh vegetable having enlarged petioles as a predominant feature which comprises:

(a) selecting a petiole of a vegetable having enlarged petioles as a predominant feature, said petiole having chemical and physiological properties characteristic of the petioles of the vegetable in its market mature state, which provide acceptable shelf life.

(b) cutting said petioles into pieces in a manner effective to minimize bruising throughout the cut pieces and tissue damage in the vicinity of the cut surfaces, (c) contacting said petiole pieces with water at about 1° C. to about ambient temperature for about 2 to about 5 minutes, (d) drying the surface of said petiole pieces, and (e) providing the petiole pieces in a sealed container effective to prevent microbial recontamination of the petiole, said package having a gas permeability effective to maintain the petiole pieces in a viable condition.

In another embodiment, this invention concerns the product prepared by this process.

DESCRIPTION OF THE PREFERRED EMBODIMENT

Figure 1:
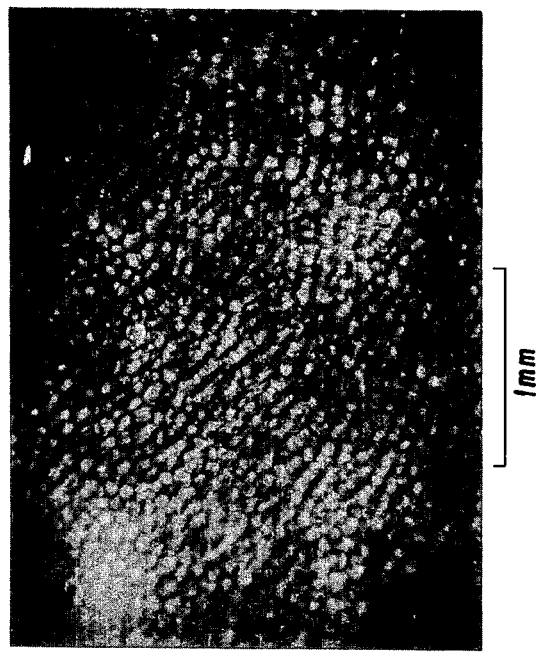
FIGS. 1–4 are photographs showing the cut surface of several celery petioles.

The present invention relates to a process of improving the useful shelf life of fresh vegetables, especially celery. The invention also relates to the vegetable produced by this process. In one embodiment, this invention relates to celery prepared as a ready-to-eat raw snack food and provided in a package which may be stored for a period substantially longer than raw fresh celery which have not been treated by the process of the present invention. Celery provided in this fashion is ideal for use with party dips or for inclusion in a lunch box or a picnic basket since they require no preparation and can be served or eaten "right out of the package."

The basic purpose of this invention is to provide to the consumer a ready-to-eat vegetable maintained for a prolonged period in a viable form so that when it is subsequently eaten, it will provide substantially the same sensory qualities of appearance, texture, odor and taste as the freshly harvested raw vegetable. As used herein, the term viable condition, as applied to a fresh vegetable, means the maintainence of the fresh condition of the vegetable by the slowing down of degenerative biochemical reaction and transpiration. Without treatment in accordance with this invention, the growth of microflora in the fresh vegetable will in a short time adversely affect the organoleptic qualities of the vegetable even if stored under refrigeration. By practicing the process of the present invention, biochemical degradation and moisture loss are slowed down and the rate of growth of the endogenous microflora present in fresh celery, for example, is controlled so that the useful shelf life of the celery can be prolonged by about 14 to about 21 days at a 10° C. storage temperature. This prolonged shelf life is referred to herein as acceptable shelf life.

The vegetables which are particularly adapted to the process of the present invention are those which are known collectively as vegetables having enlarged petioles as a predominant feature. These petiolate vegetables include celery, rhubarb, Swiss chard, bok choy and the like. Celery is especially well suited to being treated in accordance with the present invention which will be explained below using celery as the vegetable being processed. This is done for illustration purposes, and although celery is especially preferred when practicing this invention, other vegetables having enlarged petioles, as explained above, may be employed.

In most instances, celery will be provided in a condition whereby the consumer can eat the celery without any preparation. Thus, before the celery is shipped to the processing plant to be treated in accordance with the present invention, the harvested celery should be topped and the loose soil removed from the exterior surface of the celery. This can be performed in the field during harvesting or just prior to shipping for processing at the packaging plant.

When practicing the process of the present invention, the first step is concerned with selecting celery petioles that have the qualities and properties which will provide a long shelf life since not all celery varieties and not all celery petioles provide the same shelf life. The standard which is usefully employed here is market mature celery. By "market mature" is meant celery which has reached a state of maturity which makes it ideally suited for harvesting and shipping to market for public sale and consumption. Celery will continue to grow and mature after it has reached the state where it would be ready for market. However, this "fully mature" celery does not contain as high a percentage of petioles which can usefully be employed in the present invention as the percentage of useful petioles which could be obtained from that same celery plant at the earlier stage in its development which is known as the "market mature" stage. Regardless of the degree or level of maturity of a celery petiole, it may be usefully employed if it has the chemical and physiological properties characteristic of those petioles of market mature celery which have acceptable shelf life.

It has been found that in many instances, the middle and inner petioles of market mature celery provide longer shelf life than the outer petioles of market mature celery when these petioles have been processed and packaged in accordance with the instant invention.

These petioles which provide acceptable shelf life exhibit chemical and physiological properties which have a dramatic effect on the shelf life of celery and which distinguish these petioles from other portions of market mature celery which do not provide as long a shelf life. Specifically, the chemical properties of the petioles of mature market celery which provide acceptable shelf life include protein which should be about 0.98% by weight and above, preferably about 1.0% by weight and above and ash which should be less than about 0.85% by weight, preferably less than about 0.83% by weight and above about 0.60% by weight.

The physiological properties of the petioles of market mature celery can be utilized to select those petioles which may be usefully employed in the process of this invention. The cell size of the useful petioles are smaller than those which are unacceptable, and the vacuoles of the useful petioles are larger than those of the unacceptable petioles. The cell size of the useful petioles are in the range of about 9 to about 12 cells per mm, as they appear on the cut surface of the petiole. Further, when the petiole is cut, the pithiness of the cut surface is evidence of its acceptability. If "islands" of white appear in the cut surface, the petiole is unacceptable. The cells in the areas of whiteness will eventually separate causing void areas to appear in the cut surface of the petiole. This is unacceptable. Useful petioles do not have any islands of whiteness on the cut surface.

The petioles which may be usefully employed in the practice of the present invention have been described above in terms of the chemical and physiological properties of the petioles of market mature celery which provide acceptable shelf life. These particular petioles provide exceptionally superior shelf life when prepared in accordance with the process of the instant invention. Celery petioles obtained from celery which is not market mature, i.e., either less or more mature, may be employed in the present invention if the chemical and physiological properties of these petioles are within the parameters described above for the useful petioles of market mature celery. One skilled in the art, without an undue amount of experimentation, can readily determine if particular celery petioles having a particular degree of market maturity have the chemical and physiological properties of those petioles of market mature celery which provide acceptable shelf life.

Since the celery is to be provided in a ready-to-eat form, the celery petiole should ideally be of a small diameter variety which can be cut to the desired length, usually 3–5 inches. For larger diameter petioles, they can be cut to provide celery sticks of about 3–5 inches in length and a cross section of about ⅜–⅝ in. by ⅜–⅝ in.

In the practice of the invention, the second step is slicing the celery to provide it in the stick-size pieces described above. Slicing of the celery petiole must be accomplished in such a manner that will minimize the tissue damage that is generally attributable to tearing and compression. Many conventional methods of slicing vegetables cause excessive damage to the tissue of celery and thus shorten the shelf life. For example, when celery is sliced with a regular kitchen paring knife, the tissue in the vicinity the cut has excessive damage caused by compression and tearing. This excessive damage to the tissue causes rapid spoilage and thus shortens the shelf life. It has been found that this excessive damage can be avoided by slicing the celery with a razor sharp blade employing only enough pressure on and sufficient sawing motion of the blade to effect a clean cut. Alternatively, excessive damage can be avoided by slicing the celery with a fluid jet maintained in a narrow stream and with a sufficiently high pressure and velocity to effect a clean cut. Either type of slicing allows the cut petiole, if properly stored, to form a very thin dry layer at the cut surface which further slows microbial and enzymatic damage. An additional benefit to either type of slicing is that the cut surface is dry to the touch, but appears to be moist which makes the celery more appealing to the consumer. A high pressure fluid jet has been found to be very useful in the practice of the present invention. It is characteristic of the fluid jet to slice a vegetable with minimum compression damage to tissue while retaining the fresh appearance of the vegetable. It is preferred to use a water jet cutter with an orifice diameter about 0.003 to about 0.012 in. employing pressures of about 30,000 psi to about 50,000 psi.

After the celery petioles are cut into appropriate sized pieces, the sliced petioles are subjected to a water treatment. The celery is water treated to substantially reduce the endogenous microflora on the surface of the vegetable and thus prolong shelf life. The water should preferably be chlorinated at a concentration of about 10 to about 250 ppm, with about 25 to about 100 ppm being preferred. The celery is contacted with the water (chlorinated or not) for a period of time effective to reduce the microflora, with about 2 to about 5 minutes being preferred. The temperature of the water can be from about 1° C. to ambient temperature with about 1° C. to about 10° C. being preferred. It is contemplated that any conventional method of contacting vegetables with water may be employed here. For example, the water can be applied by spraying it onto the pieces of celery or by placing the pieces of celery between two conveyor belts and passing the conveyor belts through a body of water.

After being treated with the water, the surface of the celery is dried by any conventional method known to those skilled in the art. For instance, one method involves spin drying the celery to remove the surface water without the addition of any heat. In another convenient method, dry, cool (1° C. to ambient) air is passed over and through a perforated tray or conveyor containing the water treated pieces of celery.

The sliced, dry celery is now ready for the final operation of packaging. The celery is placed in a sealed package to prevent undue moisture loss as measured by texture and weight loss and to prevent microbial recontamination. The packaging material should have a gas permeability effective to permit sufficient respiration for maintaining the celery tissue in a viable condition. Typically, useful packaging materials should have a gas permeability of about 50 to about 300, preferably about 75 to about 200, cc of $O_2/100$ in$^2$—atm.—24 hrs. and about 200 to about 800, preferably about 400 to about 600, cc of $CO_2/100$ in$^2$—atm.—24 hrs. and a moisture transmission rate of less than about 1.5, preferably less than about 0.5, g/100 in$^2$—24 hrs—90% R.H., 70° F. Further, the ratio of product mass to package surface should be in the range of about 1 to about 6 g/in$^2$. Packages can be made from flexible or semirigid materials in various shapes and forms including three sided pouches and thermoformed tubs to provide an attractive, eye-catching package. Foamed polypropylene has been found to be useful as a packaging material in the practice of this invention.

For maximum shelf life, the packages of celery should be maintained under refrigeration at a temperature of above 2° to below 15° C., preferably about 2° to about 4° C. Packaged celery prepared in accordance with the process of this invention has a shelf life of about 14 to about 21 days longer than packaged celery which has not been similarly processed.

The following examples are presented as specific embodiments of the present invention and show some of the unique characteristics of the instant process and are not to be considered as constituting a limitation on the present invention.

EXAMPLE 1

This example demonstrates the importance of the chemical properties of celery petioles in achieving superior shelf life.

Market mature celery was harvested, and a number of outer petioles and inner petioles were selected for treatment in accordance with the present invention. Samples of these petioles were subjected to chemical analysis for protein and ash.

The outer petioles were cut into 3 inch long pieces using a razor sharp, thin knife employing a sawing motion and only slight pressure. The pieces of outer petiole were treated with chlorinated water (25–100 ppm) at a temperature of about 3° C. for 5 minutes. Following the water treatment, the celery pieces were spun dry and packaged in foamed polypropylene. The packaged celery was stored at 10° C.

The inner petioles were subject to the same treatment of cutting, water treatment, spin drying, packaging and storage as the outer petioles.

The stored packages of treated celery were periodically evaluated for acceptable sensory quality, i.e. acceptable shelf life.

The results of the chemical and sensory evaluation are presented in Table I.

TABLE I

|  | Outer Petiole | Inner Petiole |
| --- | --- | --- |
| Protein, % | 0.83 | 1.19 |
| Ash, % | 0.96 | 0.69 |
| Shelf life, days at 10° C. (Acceptable sensory quality) | 25 | 48 |

EXAMPLE 2

The physiological properties of the petioles of market mature celery were evaluated.

Figure 2:
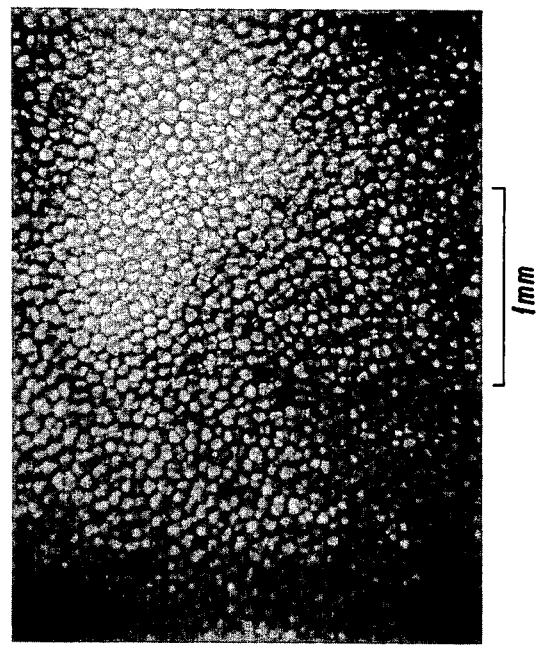
Figure 3:
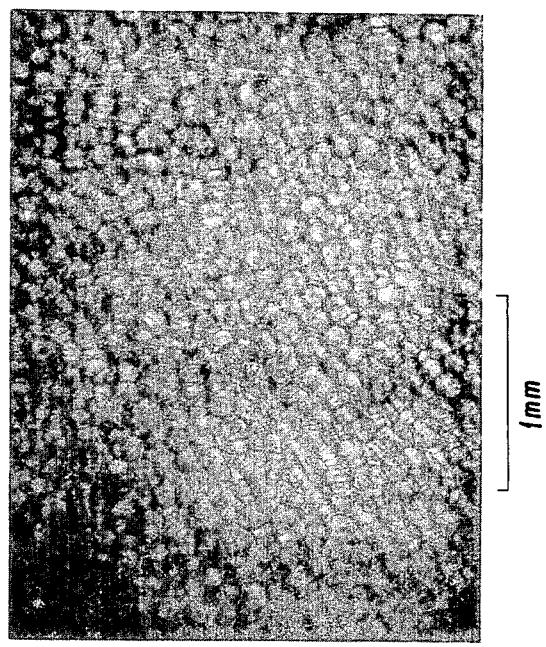

Several acceptable petioles and an unacceptable petiole of market mature celery were selected and each was cut with a razor sharp, thin knife employing a sawing motion and slight pressure. A microphotograph of each cross section was obtained at 32× magnification to show the cell size of the petiole. The cell size of the acceptable petioles (FIGS. 1 and 2) are noticeably smaller than the cells of the unacceptable petiole (FIG. 3). In FIG. 1, there are about 12 cells/mm, in FIG. 2, there are about 10 cells/mm, while in FIG. 3 there are only about 6 cells/mm.

Figure 4:

A petiole evidencing pithiness was selected. The petiole was cut with a razor sharp knife in the same fashion as employed above. A microphotograph of the cross-section surface of the petiole was obtained at 32× and is presented in FIG. 4. The dark spots are void spaces between the cells and show the pithiness of this unacceptable petiole.

EXAMPLE 3

The effect of cutting techniques were evaluated.

The inner petioles of market mature celery were prepared for shelf life evaluation employing the same preparation procedure of Example 1 except that a number of different cutting techniques were employed. The cutting methods utilized the following cutting devices:

1. Regular kitchen paring knife
2. Commercial rotary blade cutter
3. Single edge razor blade
4. Razor sharp, thin blade knife
5. Water jet cutter (0.007′ dia. orifice, 30,000 psi)

The packaged celery was stored at 10° C. and evaluated for acceptable sensory quality and for microflora count. Samples cut with the razor sharp knife and the water jet cutter were also stored at 3° C. The results presented in Table II show the microbial count after 16 days storage at 10° C. and the number of days storage which provided acceptable sensory quality at 10° C. and 3° C. storage temperatures, i.e. acceptable shelf life.

TABLE II

| Cutting Method | Microflora Count CFU/g[1] | Number of days of Acceptable Sensory Quality | |
|---|---|---|---|
| | | 10° C. | 3° C. |
| 1. Kitchen Paring Knife (cut with pressure) | $2 \times 10^{11}$ | 12 | — |
| 2. Commercial Rotary Blade Cutter | $4 \times 10^{11}$ | 13 | — |
| 3. Single Edge Razor Blade | $1 \times 10^9$ | 24 | — |
| 4. Razor Sharp Thin Blade Knife (cut with sawing motion, light pressure) | $1 \times 10^6$ | 25–40 | 61 |
| 5. Water jet cutter | $5 \times 10^7$ | 25–40 | 61 |

[1]Colony forming units/gram

The superiority of the razor sharp, thin blade knife, and the water jet cutter is readily apparent.

EXAMPLE 4

A number of packaging materials were evaluated for the storage of celery prepared in accordance with the subject invention.

The transmission rates of several gases $O_2$, $CO_2$, water vapor) were measured for a number of packaging films. The results are presented in Table III.

TABLE III

| Film Type | $O_2$[1] | $CO_2$[2] | Water Vapor[3] |
|---|---|---|---|
| Low Density Polyethylene, 1.5 mil | 1080 | 3160 | 0.67 |
| Low Density Polyethylene, 2.0 mil | 810 | 2370 | 0.50 |
| Foamed Polypropylene, 1.6 mil | 140 | 540 | 0.41 |
| Paper/Surlyn | 300 | 1450 | 0.70 |
| Foamed Polypropylene/ Polypropylene | 65 | 260 | 0.24 |
| Metallized Polyethylene terephthalate | 1 | 4 | 0.10 |
| Nylon/Polyethylene | 1 | 35 | 0.20 |

[1]cm³/100 in² - day - atm.
[2]cm³/100 in² - day - atm.
[3]gm/100 in² - day, 90% R.H, 70° F.

A number of inner petioles of market mature celery were prepared in accordance with the procedure of Example 1 except that each of the above packaging materials were utilized in preparing the packaged celery. After storing the packages for 15 days at 10° C., the microflora content of the cut celery petioles was evaluated. The results are shown in Table IV.

TABLE IV

| | Microflora Content (Colony forming units/gram) |
|---|---|
| Foamed Polypropylene, 1.6 mil | $8.06 \times 10^6$ |
| Paper/Surlyn | $7.47 \times 10^7$ |
| Foamed Polypropylene/ Polypropylene | $9.77 \times 10^6$ |
| Metallized Polyethylene terephthalate | $7.36 \times 10^8$ |
| Nylon/Polyethylene | $9.70 \times 10^8$ |
| Low Density Polyethylene, 1.5 mil | $2.97 \times 10^9$ |
| Low Density Polyethylene, 2.0 mil | $1.40 \times 10^9$ |

Obviously, other modifications and variations of the present invention are possible in the light of the above teachings. It is, therefore, to be understood that changes may be in the particular embodiments of this invention which are within the full intended scope of the invention as defined by the appended claims.

What is claimed is:

1. A packaged vegetable product comprising a shelf-stable fresh vegetable having enlarged petioles as a predominant feature, said product being prepared by
   (a) selecting a petiole of a vegatable having enlarged petioles as a predominant feature, said petiole having chemical and physiological properties characteristic of the petioles of the vegatable in its market mature state, which provide acceptable shelf life, the chemical properties including protein of about 0.98% by weight and above and ash of less than about 0.85% by weight, and the physiological properties including tissue cells having a size of about 9 to about 12 cells per mm and a lack of pithiness in the cut surface of the petiole,
   (b) cutting said selected petiole into pieces in a manner effective to minimize bruising throughout the cut piece and damaging of tissue in the vicinity of the cut surfaces, and
   (c) contacting said petiole pieces with water at about 1° C. to about ambient temperature for about 2 to about 5 minutes,
   (d) removing surface water from said petiole pieces, and
   (e) packaging said petiole pieces in a sealed container effective to prevent microbial recontamination of said petiole pieces, said container having a gas permeability and a ratio of the mass of said petiole pieces to the container surface effective to maintain said petiole pieces in a viable condition, the gas permeability being about 50 to about 300 cc of $O_2$/100 in$^2$—atm.—24 hrs., about 200 to about 800 cc of $CO_2$/100 in.$^2$—atm.—24 hrs., and a moisture transmission rate of less than about 1.5 g/100 in.$^2$—24 hrs.—90% R.H., 70° F. and the ratio of the mass of said petiole pieces to the container surface being about 1 to about 6 g/in$^2$.

2. A product according to claim 1, wherein the vegetable is celery.

3. The product according to claim 1, wherein the cutting step of (b) is accomplished by a razor sharp, thin blade employing only sufficient pressure and sawing motion of said blade to effect a clean cut.

4. The product according to claim 1, wherein the cutting step of (b) is accomplished by a water jet cutter with an orifice diameter of about 0.003 to about 0.012 inches and a pressure of about 30,000 to about 50,000 psi to effect a clean cut.

5. The product according to claim 1, wherein the water of step (c) is chlorinated.

6. The product according to claim 1 or 2, wherein the sealed container of step (e) comprises foamed polypropylene.

* * * * *